though the presence of weak bases, such as ammonia, hydroxylamine, pyridine, or in the presence of magnesium carbonate.

The action of HCN and ammonia on ferrous salts, in the art of illuminating gas purification, was investigated by Burschell, Bueb, Feld (1893–1904). Tau (1919) observed that leuco-ferrocyanide may also be formed by reacting, in the presence of ammonium sulphate and ferrous sulphide, coke oven plant gases containing HCN or cyanogen. None of these prior researches resulted in a definitive process for obtaining leuco products having the characteristics desired for preparation of the pigments; not only in respect to the desired composition thereof, but also in respect to its aptitude for generating the formula designated pigmentary blue by oxidation.

The present invention relates to the preparation of the leuco paste by action of HCN and ammonia on ferrous sulphate in the presence of ammonium sulphate, by carrying out the entire reaction in such a manner as to maintain a pH of 3.5 to 5.5, and preferably 4 to 5, in non-oxidative medium at room temperature.

The process may also be effected with other basic substances, for example with various bases, including amino bases, or by using virtual alkalis such as magnesium carbonate or analogous substances, and alkali acetates, or alkaline earth metal bases acetates, carbonates, and other alkaline reacting salts of strong bases and weaker acids.

The present invention particularly concerns a definite process employing a succession of reagents inverse to that of the above-mentioned old experiments, whereby the technical advantages specified below are obtained.

The process, as carried out according to this invention, involves saturating the ferrous sulphate solution with HCN, employed in preferred or required ratios. The ferrous sulphate solution can also contain ammonium sulphate. Ammonia (or other bases) are allowed to react with the hydrocyanic solution, in such a manner as to obtain, with ammonia, the ratio $1NH_4:1Fe:3CN^-$, in the product. By this expedient the required acidity is developed by setting free $H_2SO_4$ from ferrous sulphate. The process is characterized by the regulation of the HCN ratios in respect to the base and ferrous sulphate so as to reach and maintain during the reaction the above-indicated acidity, at pH 5–4. This is a salient characteristic of the process, since up to the present time the possibility of reaching the aforesaid acidity, and maintaining it in continuously working equipment, had not been recognized.

The preparation of the leuco derivative must be carried out in non-oxidative atmosphere in order to prevent the autoxidation of the ferrous pastes which impair the pigmentary characteristics of the end product. The atmosphere in which the reaction is carried out is an inert or non-oxidizing gas, preferably nitrogen.

The process also permits direct utilization, for successive reaction with ferrous sulphate, of the gaseous $NH_3$ and HCN mixtures obtained by synthesis of HCN from methane and ammonia on platinum base catalysts. Such gaseous mixtures can be employed here whether obtained from methane and $NH_3$ by an endothermic synthesis, or by a methane, $NH_3$ and air exothermic synthesis. The mixture containing HCN and $NH_3$ may be corrected or adjusted to obtain the desired ratio $NH_3:HCN$. Use of these synthesis gases has the advantage of obtaining a medium which is already non-oxidative. In such case the process involves the absorption of hydrocyanic and ammoniacal gas by the ferrous sulphate solution, which can also contain ammonium sulphate, whereby the leuco-ferrocyanide is produced with a ratio of $1NH_3:3HCN$, and the desired acidity is released.

The above-mentioned process results in a very marked and unexpected economy in the production of the leuco

---

United States Patent Office 3,094,379
Patented June 18, 1963

**3,094,379
PROCESS FOR PREPARING PRUSSIAN BLUE, AND ANALOGOUS PIGMENTS, FROM HYDROCYANIC ACID, FERROUS SULPHATE AND BASES**
Livio Cambi, Milan, Italy, assignor to Montecatini Società Generale per l'Industria Mineraria e Chimica, Milan, Italy
No Drawing. Filed June 1, 1960, Ser. No. 33,091
Claims priority, application Italy June 4, 1959
8 Claims. (Cl. 23—77)

This invention concerns the preparation of Prussian blue by employing hydrocyanic acid, having a degree of purity, or mixed with other gas, or in aqueous solution.

Prussian blue is ferric salt of ferrocyanic acid, $$H_4[Fe(CN)_6]$$

The blue is of the formula $Fe_4[Fe(CN)_6]_3$. The ferrous compound, which is of the formulae $Fe_2[Fe(CN)_6]$ (insoluble), or $K_2Fe[Fe(CN)_6]$, is white but becomes blue by oxidation.

The Berlin, or Prussian blues, used as pigments, are prepared industrially from alkaline or ammonium ferrocyanide by reacting the latter in a primary phase, or stage, with ferrous salts, particularly with ferrous sulphate.

The primary intermediate product so obtained is in form of "white paste" or "leuco paste," also called Berlin whites, in which generally the presence of double salts of the following type is assumed:

$$Me_2^I Fe^{II}[Fe^{II}(CN)_6]$$

where $M^I$ represents potassium cation, or ammonium cation etc.

In the most widely applied technique, these pastes are obtained by reacting sodium ferrocyanide with ferrous sulphate in solutions containing ammonium sulphate; the latter may even be used in excess, in respect to the formula weight ratio $1(NH_4)_2SO_4:1FeSO_4$. Under such conditions the reaction leads to leuco-ferrocyanide, to which the following structure may be assigned, in this instance:

$$(NH_4)_2Fe^{II}[Fe^{II}(CN)_6]$$

This corresponds to the ratio of $1NH_3$ to $1Fe/3CN^-$, i.e. to the following empirical formula:

$$\{NH_4 \cdot Fe(CN)_3\}$$

The above-mentioned leuco-ferrocyanide is autoxidizable in air, and produces the blue pastes. However, the technically employed pigments are otbained by applying various oxidizing agents in acidic medium. Sodium chlorate, potassium chlorate, sodium bichromate, and other oxidizing agents are used in special cases.

The oxidation process, at least in its initial phase, may be regarded as a transformation from ferrous to ferrous-ferric structure, of the blue, as follows:

$$Me_2^I\{Fe^{II}(CN)_6Fe^{II}\} \rightarrow Me^I\{Fe^{III}(CN)_6Fe^{III}\}$$

In practice, the oxidation as carried out in industry, namely at higher temperatures in an acidic medium, alters the $2Fe/6CN$ ratio, through a more or less advanced degree of removal of $CN^-$.

The formation of leuco-cyanides and blue-cyanides from HCN has been known for many years. It was investigated by Fresenius (1842–1858).

The action of HCN on ferrous salts in the presence of alkaline, or virtually alkaline, substances, has also been studied for a long period, in respect to the structure of Prussian blue.

Early researches, reported in 1904/1907 by K. A. Hofmann et al., were directed to the formation of the leuco-products pastes from ferrous salts and HCN in the prespaste in comparison with industrial methods in common use, which methods were discussed above. There is another important advantage. Owing to the conditions employed in the precipitation, that is, the acidity, the ratios of the reagents, the temperature, and the atmosphere, the precipitation results in a crystalline precipitate of the leuco salt, from which a blue having superior pigmentary characteristics is produced by oxidation.

In the discontinuous process the yields of pigment are 70–80%, referred to HCN content.

By recovering the unreacted HCN, the yields can be increased beyond 90%.

The following examples are presented only to illustrate the invention, without intent to limit its scope in any manner.

Example I

To 200 cc. of an aqueous solution of HCN containing 32.4 grams per liter HCN, 100 cc. of an aqueous ferrous sulphate water solution containing 222.6 g./l. $FeSO_4 \cdot 7H_2O$, and at the same time 50 cc. aqueous $NH_3$ solution containing 62 g./l. $NH_3$, are added.

The solutions are added in such a manner as to maintain a pH in the range from 4 to 5. The atmosphere in which the process is operated is nitrogen.

The reaction mass is heated to 50° C. for 30 minutes, and is then acidified until pH 1 is reached, and boiled for 3 hours.

The leuco paste so obtained is oxidized at 50° C. with 100 cc. of potassium chlorate water solution containing 13.2 g./l. $KClO_3$.

After standing 3 hours at room temperature, the blue is washed by decantation and dried at 70° C.

Example II

To 200 cc. of an aqueous solution of HCN containing 10.7 grams of HCN per liter of water, 90 cc. aqueous ferrous sulphate solution (71 g./l. $FeSO_4 \cdot 7H_2O$) are added, and at the same time 15.5 cc. of aqueous diethylamine solution [280 g./l. $(C_2H_5)_2NH$].

Both solutions are to be added according to the preceding example, and in a stream of nitrogen. After heating to 50° C. for 30 minutes, the solution is acidified at pH 1, and boiled for 3 hours. The leuco paste is oxidized at 50° C., using 100 cc. potassium chlorate water solution (4.7 g./l. $KClO_3$).

The succeeding operations are carried out according to the preceding example.

Example III

To 200 cc. HCN water solution (31 g./l. HCN) are added: 100 cc. ferrous sulphate water solution (231 g./l. $FeSO_4 \cdot 7H_2O$), and then 90 cc. sodium carbonate water solution (90 g./l. $Na_2CO_3$), followed by 30 cc. water ammonia solution at 68 g./l. $NH_3$, operating according to Example I.

The succeeding operations are performed in the usual manner, finally oxidizing with 100 ml. potassium chlorate water solution (14 g./l. $KClO_3$).

Example IV

To 200 cc. HCN water solution (27.60 g./l. HCN) are added: 100 cc. ferrous sulphate water solution at 160 g./l. $FeSO_4 \cdot 7H_2O$, and then 45 cc. potassium acetate 4 M solution. The succeeding operations are executed in the usual manner, by oxidizing, finally, with 76 ml. potassium chlorate water solution (15 g./l. $KClO_3$).

Example V

To 200 cc. HCN water solution (25.60 g./l. HCN) are added 93.5 cc. ferrous sulphate water solution (160 g./l. $FeSO_4 \cdot 7H_2O$) and then 56 cc. ammonium acetate water solution. The final operations are performed in the usual manner, by oxidizing with 73 ml. potassium chlorate water solution at 15 g./l. $KClO_3$.

Example VI

To 200 cc. HCN water solution (30 g./l. HCN) are added 106.3 cc. ferrous sulphate solution (160 g./l. $FeSO_4 \cdot 7H_2O$), then 15 ml. potassium acetate 4 M solution and 70 cc. water ammonia solution (47 g./l. $NH_3$).

The succeeding operations are performed in the usual manner, including finally oxidizing with 87.5 ml. potassium chlorate water solution (15 g./l. $KClO_3$).

The proportions employed in the above 6 examples are summarized as follows: The moles of ammonia employed are less than the moles of HCN. This results in an acid pH between 3.5 and 5.5. This is tabulated as follows:

| Example | | HCN | Base | $FeSO_4$ | Ratios |
|---|---|---|---|---|---|
| 1 | gram | 6.48 | 3.1—$NH_3$ | 12.3 | 3:2.25:1 |
|   | mol  | 0.24 | 0.18 | 0.08 | |
| 2 | gram | 2.14 | 4.35—$Et_2NH$ | 3.49 | 3.46:2.58:1 |
|   | mol  | 0.0795 | 0.0595 | 0.023 | |
| 3 | gram | 6.2 | 10.14—$NH_3+Na_2CO_3$ | 11.65 | 2.94:3.46:1 |
|   | mol  | 0.2297 | 0.196 | 0.078 | |
| 4 | gram | 5.52 | 17.65—$CH_3COOK$ | 8.75 | 3.55:3.14:1 |
|   | mol  | 0.204 | 0.18 | 0.0575 | |
| 5 | gram | 5.12 | 17.25—$CH_3COONH_4$ | 8.15 | 3.54:4.18:1 |
|   | mol  | 0.1895 | 0.224 | 0.0536 | |
| 6 | gram | 6.0 | 9.16—$NH_3+CH_3COOK$ | 9.26 | 3.48:4.15:1 |
|   | mol  | 0.222 | 0.2535 | 0.061 | |

In Examples 3, 4, 5, 6 there are present more than 3 moles of basic substances. This is due to the fact that the alkalies employed are less basic than ammonia.

In its preferred form, the process is directed to preparation of ferrous leuco-ferrocyanide (leuco paste) suitable for obtaining pigmentary blue, from hydrocyanic acid, ammonia and ferrous sulphate, and is characterized in that the said reagents are employed in molar ratios determined so as to obtain a pH value from 3.5 to 5.5; preferably from 4 to 5, in non-oxidative medium. However, the ammonia preferentially employed in this process, viz. in the specific examples set forth above, can be replaced in whole or part by an organic amine such as mono- or dimethyl amine, ethyl amine, propyl amine and higher amines or by quaternary ammonium bases, or hydroxylamine. The ammonia may also be replaced, in said examples, by the virtual alkali substances described above.

I claim:

1. A process of making leuco ferrous-ferrocyanide suitable for oxidation to blue pigment, comprising reacting the substances hydrocyanic acid, ammonia, and ferrous sulphate in aqueous medium, at a pH of from 3.5 to 5.5 maintained until the reaction of said substances is substantially completed, the reaction being carried out in non-oxidizing atmosphere, the molar ratio of the reactants being substantially as follows:

to maintain said pH, the process being carried out by adding the ammonia to an aqueous solution of hydrocyanic acid saturated with ferrous sulphate.

2. The process of making blue pigment, comprising reacting the substances hydrocyanic acid, ammonia, and ferrous sulphate in aqueous medium, at a pH of from 3.5 to 5.5 maintained until the reaction of said substances is substantially completed, the reaction being carried out in non-oxidizing atmosphere, the molar ratio of the reactance being substantially as follows:

$$HCN:NH_3:FeSO_4 = 3:2.25:1$$

to maintain said pH, the process being carried out by adding the ammonia to an aqueous solution of hydrocyanic acid saturated with ferrous sulphate, acidifying to below pH 3.5 and oxidizing the resulting leuco ferrous ferrocyanide to blue pigment.

3. A process of making leuco ammonium ferrous-ferrocyanide suitable for oxidation to blue pigment, comprising mixing aqueous solutions of the substances hydrocyanic acid, ammonia and ferrous sulphate at room temperature, the reaction mixture being thereafter heated to speed the reaction, the solutions being added in such manner as to maintain a pH range of from 3.5 to 5.5, the pH being maintained in said range during substantially the entire reaction of said substances, the reacting being carried out in a non-oxidizing atmosphere, the recited pH being maintained by mixing predetermined concentrations of aqueous solutions of each of the substances in the proportions required to maintain said pH, the ammonia being incorporated with a mixture formed of an aqueous solution of hydrocyanic acid and ferrous sulphate, the molar ratio of the reactants being substantially as follows: 3:2.25:1, to obtain the following ratio in the product:

$$1NH_4:1Fe:3CN^-$$

4. A process of making a crystalline leuco ferrous-ferrocyanide salt of an alkaline reacting substance, suitable for oxidation to blue pigment, comprising mixing aqueous suspensions of hydrocyanic acid, an alkaline reacting substance, and ferrous sulphate, a pH of between 3.5 to 5.5 being maintained substantially until the reaction is completed, the reaction being carried out in a non-oxidizing atmosphere, the alkaline reacting substance being at least one compound taken from the group consisting of alkali and alkaline earth metal and ammonium hydroxides, carbonates, acetates, amines, and quaternary ammonium bases, the recited pH being maintained by mixing predetermined concentrations of aqueous solutions of each of the substances in the proportions required to maintain said pH, the hydrocyanic acid being added to the sulphate not later than the alkaline reacting substance is added, the alkaline reacting substance being added together with or after the ferrous sulphate is added, so that the required acidity is developed by setting free $H_2SO_4$ from the ferrous sulphate, the alkaline reacting substance being employed in a total amount to obtain the following ratio in the product: 1Alk:1Fe:3CN$^-$, in which Alk signifies the $NH_4^+$ chemical equivalent of the cation of the alkaline reacting substance, the molar ratio of the reactants being in the range 3.5 to 2.9 HCN:4.1 to 2.2 alkaline reacting substance:1FeSO$_4$, the larger proportions of alkaline reacting substance being employed of the less basic members of said group.

5. The process of claim 4, the pH being from 4 to 5.
6. The process of claim 1, the pH being from 4 to 5.
7. The process of making a pigment, comprising mixing aqueous suspensions of hydrocyanic acid, an alkaline reacting substance, and ferrous sulphate, a pH of between 3.5 to 5.5 being maintained substantially until the reaction is completed, the reaction being carried out in a non-oxidizing atmosphere, the alkaline reacting substance being taken from the group consisting of alkali and alkaline earth metal and ammonium hydroxides, carbonates, acetates, amines, and quaternary ammonium bases, the recited pH being maintained by mixing predetermined concentrations of aqueous solutions of each of the substances in the proportions required to maintain said pH, the hydrocyanic acid being added to the sulphate not later than the alkaline reacting substance is added, the alkaline reacting substance being added together with or after the ferrous sulphate is added, so that the required acidity is developed by setting free $H_2SO_4$ from the ferrous sulphate, the alkaline reacting substance being employed in a total amount to obtain the following ratio in the product:

$$1Alk:1Fe:3CN^-$$

in which Alk signifies the $NH_4^+$ chemical equivalent of the cation of the alkaline reacting substance, the molar ratios of the reactants being in the range 3.5 to 2.9 HCN:4.1 to 2.2 alkaline reacting substance:1FeSO$_4$, the larger proportions of alkaline reacting substance being employed of the less basic members of said group, acidifying to below pH 3.5, and oxidizing the resulting leuco ferrous-ferrocyanide to said pigment.

8. A process of making a leuco ferrous-ferrocyanide suitable for oxidation to blue pigment, comprising mixing aqueous suspensions of hydrocyanic acid, an alkaline reacting substance, and ferrous sulphate, a pH of between 3.5 to 5.5 being maintained substantially until the reaction is completed, the reaction being carried out in a non-oxidizing atmosphere, the alkaline reacting substance being taken from the group consisting of alkali and alkaline earth metal and ammonium hydroxides, carbonates, acetates, amines, and quaternary ammonium bases, the recited pH being maintained by mixing predetermined concentrations of aqueous solutions of each of the substances in the proportions required to maintain said pH, the alkaline reacting substance being added to an aqueous solution of hydrocyanic acid saturated with ferrous sulphate, the relative amounts of the reactants being those required to obtain the following ratio in the product:

$$1Alk:1Fe:3CN^-$$

in which Alk signifies the $NH_4^+$ chemical equivalent of the cation of the alkaline reacting substance, the molar ratios of the reactants being in the range 3.5 to 2.9 HCN:4.1 to 2.2 alkaline reacting substance:1FeSO$_4$, the larger proportions of alkaline reacting substance being employed of the less basic members of said group.

References Cited in the file of this patent

UNITED STATES PATENTS

| | | |
|---|---|---|
| 2,712,980 | Hoak | July 12, 1955 |
| 2,880,061 | Muns et al. | Mar. 31, 1959 |

FOREIGN PATENTS

| | | |
|---|---|---|
| 790,885 | Great Britain | Feb. 19, 1958 |